Aug. 2, 1960 M. E. OLSON 2,947,184
VARIABLE SPEED TRANSMISSION
Filed Oct. 19, 1956 5 Sheets-Sheet 1

INVENTOR
Merton E. Olson

Aug. 2, 1960  M. E. OLSON  2,947,184
VARIABLE SPEED TRANSMISSION
Filed Oct. 19, 1956  5 Sheets-Sheet 2

INVENTOR
Merton E. Olson

Aug. 2, 1960 M. E. OLSON 2,947,184
VARIABLE SPEED TRANSMISSION
Filed Oct. 19, 1956 5 Sheets-Sheet 3

INVENTOR
Merton E. Olson

Aug. 2, 1960  M. E. OLSON  2,947,184
VARIABLE SPEED TRANSMISSION
Filed Oct. 19, 1956  5 Sheets-Sheet 4

INVENTOR
Merton E. Olson

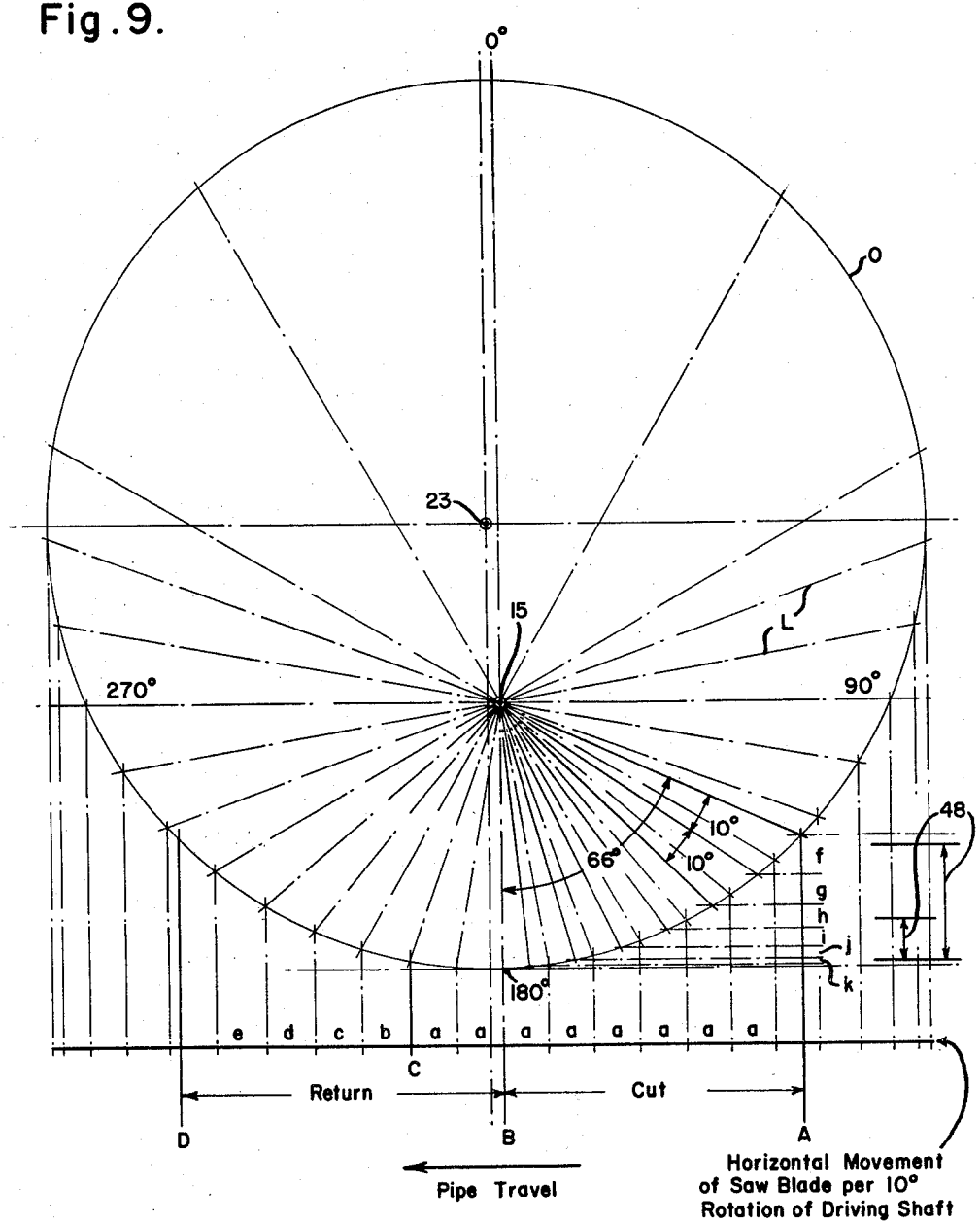

United States Patent Office 2,947,184
Patented Aug. 2, 1960

2,947,184

VARIABLE SPEED TRANSMISSION

Merton E. Olson, Dyer, Ind., assignor to The Youngstown Sheet and Tube Company, Youngstown, Ohio, a corporation of Ohio Filed Oct. 19, 1956, Ser. No. 617,137

1 Claim. (Cl. 74—69)

This invention relates to a variable speed transmission. It relates particularly to a variable speed transmission which may be employed for operating a tool so that the tool will operate on continuously moving work.

For purposes of explanation and illustration my invention will be described as embodied in mounting and operating mechanism for a rotary cutoff saw for use in continuous pipe mills. Although the invention may be utilized for mounting and operating other tools it has especial advantages in cutting into predetermined lengths continuously produced elongated articles such as pipe as they are delivered from the mill in which they are produced. The rotary cutoff saw would, of course, be equally useful in cutting bars, beams, rails and other elongated articles but it probably has its greatest utility, at the present time at least, in continuous pipe mills.

Pipes are delivered from continuous mills at high speed and it is desirable to cut the pipes into predetermined lengths while they are still moving at high speed in the direction of delivery. Modern continuous pipe mills deliver pipes at speeds as high as in the neighborhood of four hundred feet per minute. Thus the problem of cutting the moving pipes into predetermined lengths without stopping them or slowing them down is a challenging one.

In order to accomplish its function the rotary cutoff saw must move longitudinally with the pipe at constant speed equal to the speed of the pipe from the instant the cut is commenced until the cut has been completed. Also, of course, the saw while thus advancing with the pipe must have a component of movement transversely of the pipe in order to perform the sawing or cutting function. Other problems exist. In view of the necessarily high speed of the operation there is a tendency to form a large burr on the pipe at the portion of the pipe which is last cut by the saw in its movement transversely of the pipe, formation of such a burr being an incident to high speed cutting. Formation of such a large burr should be avoided. Also the mounting and operating mechanism for the saw must be provided with means for initiating a cycle of operation of the saw at the correct instant relative to the advance of the pipe to be sawed, and provision must be made for stopping each cycle at the proper time in the cycle so that the succeeding cycle will be properly synchronized to the advance of the pipe. Further, provision must be made to avoid interference with the oncoming pipe by the saw after each cut.

I have solved all of the above mentioned problems by a unique mounting and operating mechanism. To avoid formation of the large burr above referred to the saw should move at minimum speed through the last portion of pipe being cut in each cycle. This means a slowing up of the saw as it moves through the pipe. To compensate for the relatively slow speed of the saw in its movement through the pipe at the latter portion of such movement it must move at relatively high speed in the initial phase of its movement through the pipe. A particularly difficult design problem is presented when the movement of the saw through the pipe just described is correlated with movement of the saw in the direction of advance of the pipe at constant speed maintained throughout the cut. Also as soon as the cut is completed the movement of the saw in the direction of advance of the pipe should be increased until the saw passes out of the path of the pipe to avoid interference with the saw of the oncoming pipe behind the cut. Also, provision must be made for properly positioning the pipe as it moves through the sawing zone so that the saw will cut through the pipe.

My tool mounting and operating mechanism comprises a tool carrier, a tool carried thereby, means also carried by the tool carrier for operating the tool, a base, guide means for guiding in a predetermined path work to be acted on by the tool and connections between the base and the tool carrier moving the tool carrier in a generally circular path such that the tool intersects the path of the work to act on the work. The connections between the base and the tool carrier preferably move the tool carrier in a generally circular path generally in a plane substantially containing at least the portion of the path of the work traversed by the work while the work is being acted on. At the same time the connections preferably move the tool at a speed whose component in the path of the work is substantially constant. Also the connections preferably move the tool at a speed whose component generally perpendicular to the path of the work decreases as the tool acts on the work. The predetermined path in which the work is guided is preferably a substantially straight path. The connections between the base and the tool carrier preferably include a rotary device moving the tool carrier in a generally circular path, and means are preferably provided rotating the rotary device at variable speed such that the component of the speed of the tool in the path of the work during at least a portion of the time during which the paths of the tool and the work intersect is substantially constant. Such means preferably rotate the rotary device so that the component of the speed of the tool in the path of the work during the portion of the time during which the paths of the tool and the work intersect until the tool has completed its action on the work is substantially constant after which the component of the speed of the tool in the path of the work increases to insure against interference by the tool with the oncoming portion of the work following the portion thereof just acted on by the tool.

My mechanism preferably includes means stopping the tool carrier when the tool is out of the path of the work and means controlled by the work for again starting the movement of the tool carrier to initiate a new cycle of operation of the tool. I preferably provide a continuously operating source of power and work controlled means rendering at intervals the continuously operating source of power operative to operate the connections to cause the tool to act on the work. I further preferably provide means adapted to hold the connections inoperative and means rendering at intervals the continuously operating source of power operative to operate the connections to cause the tool to act on the work while rendering the holding means inoperative and thereafter rendering the holding means operative and the continuously operating source of power inoperative with respect to the connections.

The connections between the base and the tool carrier may include two parallel shafts rotating in the same direction, substantially coplanar and normally parallel arms connected with the shafts, each arm being shorter than the distance between the shafts, and pivot means carried by the arms at their outer ends and carrying the tool carrier for operation in a plane beyond the ends of the shafts. I preferably provide means for turning the shafts at variable speed.

Desirably the connections between the base and the tool carrier include a shaft and an arm carried by the shaft and to which the tool carrier is carried, an operating arm operatively connected with the shaft, a driving shaft parallel to the first mentioned shaft but having its axis offset from the axis of the first mentioned shaft, a driving arm carried by the driving shaft and a driving connection between the driving arm and the operating arm whereby the driving shaft drives the first mentioned shaft at variable speed. One of the operating arm and the driving arm may be longitudinally slotted and the other thereof may have a projection operating in the slot whereby the driving shaft drives the first mentioned shaft at variable speed. I preferably employ a longitudinally slotted driving arm and an operating arm having thereon a roller operating in the slot.

My present preferred form of tool mounting and operating mechanism comprises a tool carrier, a tool carried thereby, means also carried by the tool carrier for operating the tool, a base, guide means for guiding in a predetermined path work to be acted on by the tool, connections between the base and the tool carrier moving the tool carrier in a generally circular path such that the tool intersects the path of the work to act on the work, the connections including a shaft extending generally transversely of but spaced from the path of the work and an arm carried by the shaft and to which the tool carrier is connected, another arm operatively connected with the shaft, a driving shaft parallel to the first mentioned shaft but having its axis closer to the path of the work than the axis of the first mentioned shaft, an arm carried by the driving shaft and a driving connection between the second mentioned arm and the arm carried by the driving shaft whereby the driving shaft drives the first mentioned shaft at variable speed to move the tool carrier generally in the direction of the path of the work at substantially constant speed while the tool is acting on the work. Also the axis of the driving shaft is preferably spaced somewhat in the direction from which the work advances relatively to the axis of the first mentioned shaft resulting in driving of the first mentioned shaft by the driving shaft at variable speed to move the tool carrier generally in the direction of the path of the work at substantially constant speed until the tool has completed its action on the work and thereafter at increased speed.

In the structure shown in the drawings the connections between the base and the tool carrier include two parallel shafts rotating in the same direction, substantially coplanar and normally parallel arms connected with the shafts, each arm being shorter than the distance between the shafts, and pivot means carried by the arms at their outer ends and carrying the tool carrier for operation in a plane beyond the ends of the shafts as above recited together with a third shaft geared to said two parallel shafts for driving the same, an operating arm carried by the third shaft, a driving shaft parallel to the third shaft but having its axis closer to the path of the work than the axis of the third shaft, a driving arm carried by the driving shaft and a driving connection between the operating arm carried by the third shaft and the driving arm carried by the driving shaft whereby the driving shaft drives the third shaft and hence said two parallel shafts at variable speed to move the tool carrier generally in the direction of the path of the work at substantially constant speed while the tool is acting on the work. Means are preferably provided for stopping the tool carrier between cycles in which the tool acts on the work. Desirably a continuously operable power shaft is employed in combination with clutch means for connecting the power shaft to the driving shaft, means for interrupting the movement of the tool carrier between cycles in which the tool acts on the work and work controlled means for rendering operative the clutch means and inoperative the means for interrupting the movement of the tool carrier to initiate a cycle of the mechanism.

Other details, objects and advantages of the invention will become apparent as the following description of a present preferred embodiment thereof proceeds.

In the accompanying drawings I have shown a present preferred embodiment of the invention in which Figure 1 is a plan view of a rotary cutoff saw and its mounting and operating mechanism shown as provided in a continuous pipe mill for cutting continuously delivered pipe into predetermined lengths on the fly;

Figure 9 is a diagram illustrating the characteristics of the mechanism.

Figure 1:
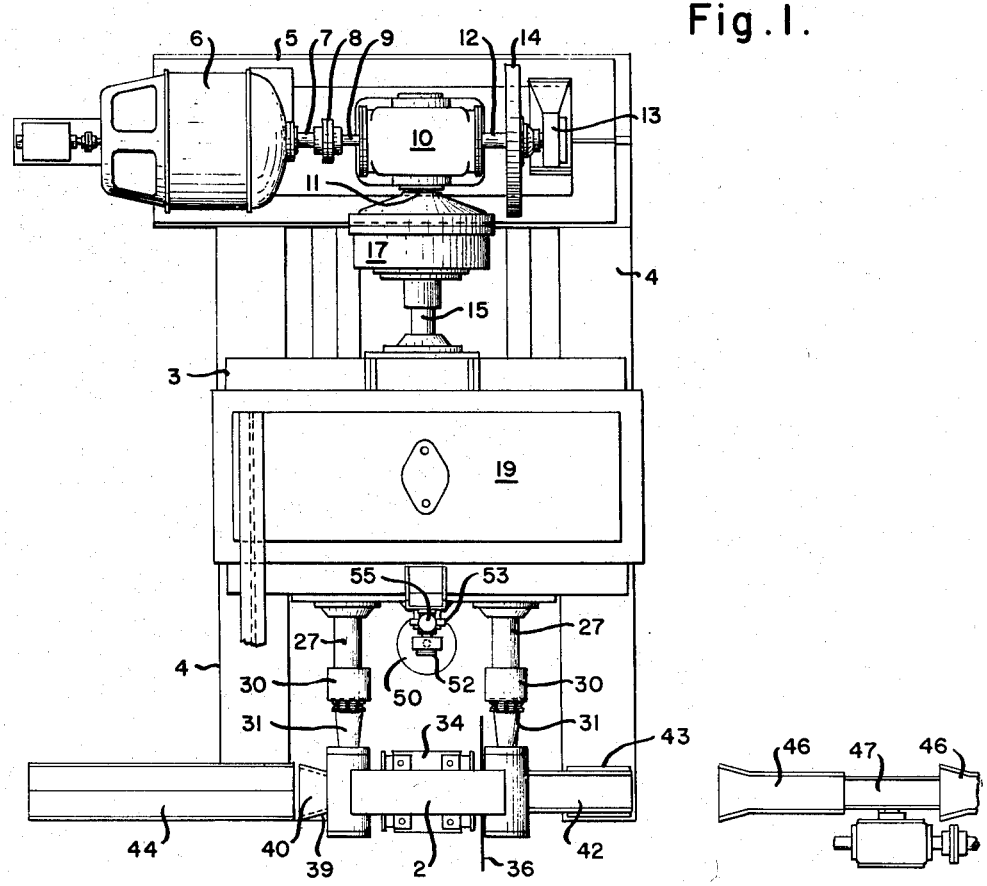

Referring now more particularly to the drawings, my tool mounting and operating mechanism comprises a tool carrier 2 and a base 3, the base being mounted upon a supporting structure 4 through suitable structural elements. Also mounted upon the supporting structure 4 is a pedestal 5 carrying a driving motor 6 having a shaft 7 connected through a coupling 8 with a shaft 9 of a speed reducer 10. The driven shaft of the speed reducer 10 is shown at 11 and constitutes the power shaft for the tool mounting and operating mechanism. A shaft 12 of the speed reducer extends to an outboard bearing 13 and has a flywheel 14 fixed thereto. By the mechanism just described the power shaft 11 is driven continuously at substantially constant speed.

Figure 2:
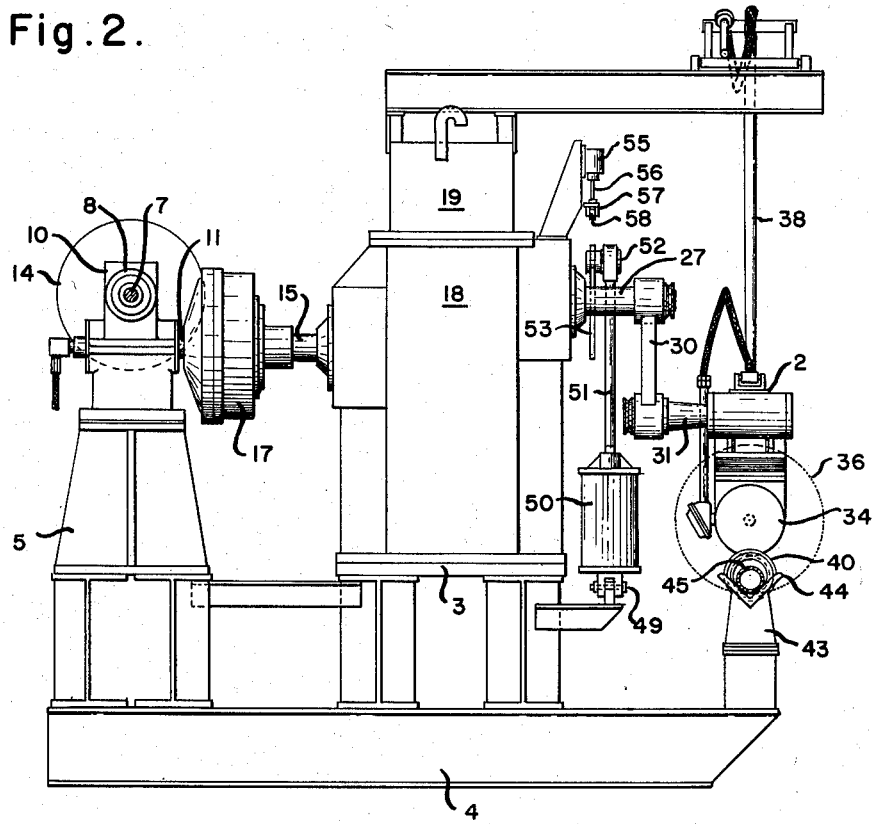
Figure 2 is an elevational view of the mechanism shown in Figure 1 as viewed from the left of Figure 1 but omitting the driving motor and showing in cross section the shaft between the driving motor and the speed reducer.

A driving shaft 15 is journalled in bearings 16 carried by the base 3. Reference numeral 17 designates an air clutch. The power shaft 11 enters the air clutch 17 at one side and the driving shaft 15 enters the air clutch 17 at the other side as shown in Figure 2 and each of the shafts 11 and 15 carries clutching elements as known to those skilled in the art. The air clutch 17 is operated by compressed air from any suitable source in known manner. The compressed air delivered to the air clutch may be controlled to render the clutch operative so that the drive shaft 15 is driven by the continuously operating power shaft 11 or inoperative so that the driving shaft 15 is disconnected from the power shaft 11. Actually in operation of my tool mounting and operating mechanism, as will presently appear, the driving shaft 15 is driven intermittently, the compressed air to the clutch 17 being controlled by the pipes being sawed through suitable control mechanism to be described.

The driving shaft 15 extends beyond the bearings 16 into a housing 18 having a cover 19. Within the housing 18 a driving arm 20 is fixed to the driving shaft 15. The driving arm 20 has therein an elongated slot 21.

Figure 4:
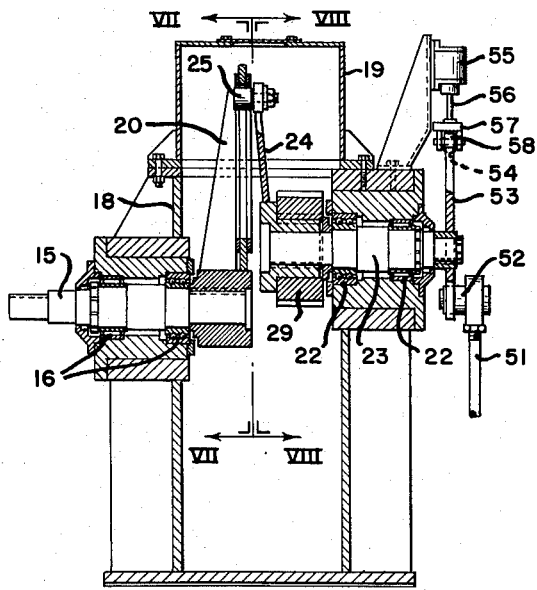
Figure 4 is a fragmentary vertical cross-sectional view through a portion of the operating mechanism.
Figure 7:
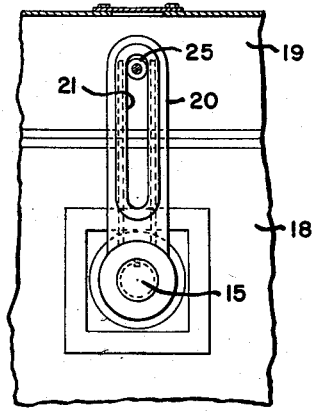
Figure 7 is a fragmentary vertical cross-sectional view taken on the line VII—VII of Figure 4.

The base carries bearings 22 at the opposite side of the housing 18 from the bearings 16 at a somewhat higher level than the bearings 16 and slightly offset horizontally from the bearings 16 in the direction toward which the pipes being sawed travel. A shaft 23 is journaled in the bearings 22. The relationship between the shafts 15 and 23 is clearly shown in Figures 4, 5 and 9. A driven arm 24 is fixed to the shaft 23, the driven arm 24 being somewhat shorter than the driving arm 20 as clearly shown in Figure 4. The driven arm 24 carries at its outer end a roller 25 which operates in the slot 21 of the driving arm 20 as shown in Figure 4. Through the driving connection between the slot 21 of the driving arm 20 and the roller 25 of the driven arm 24 the shaft 23 is driven at variable speed by the shaft 15 during the time when the shaft 15 is operating at substantially constant speed. The characteristics of movement of the shaft 23 are shown diagrammatically or graphically in Figure 9 in which the position of the shaft 23 is plotted for each 10° of rotation of the constant speed driving shaft 15.

Figure 8:
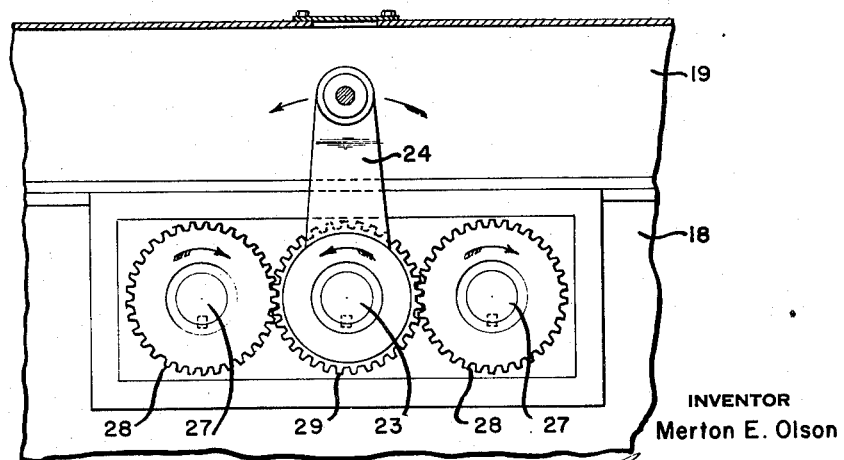
Figure 8 is a fragmentary vertical cross-sectional view taken on the line VIII—VIII of Figure 4.
Figure 5:
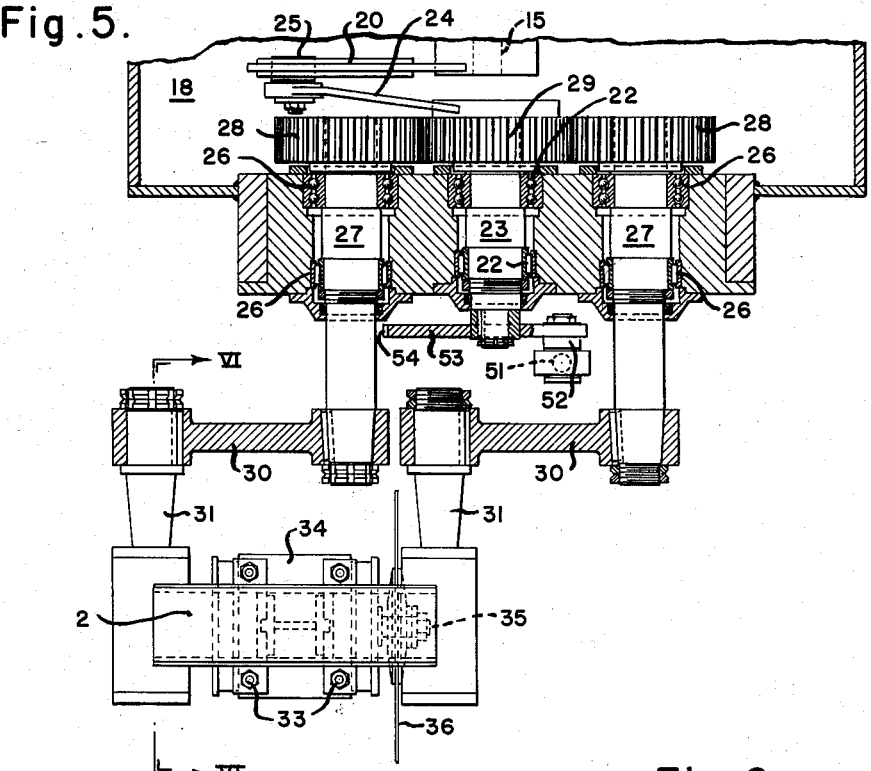
Figure 5 is a fragmentary horizontal cross-sectional view through a portion of the operating mechanism.
Figure 6:
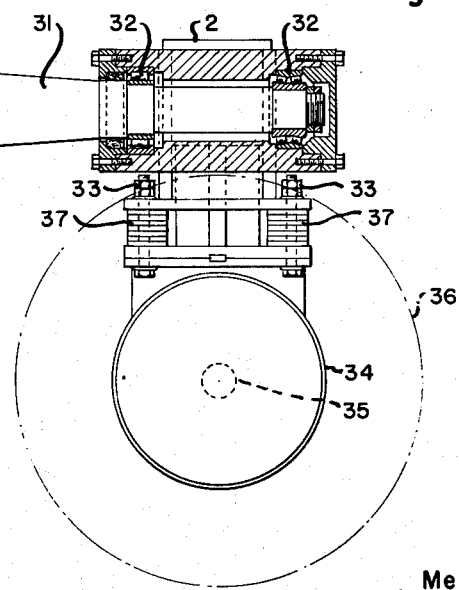
Figure 6 is a vertical cross-sectional view to enlarged scale taken on the line VI—VI of Figure 5 showing one of the arms supporting the rotary cutoff saw and its driving motor.

Mounted at opposite sides of the aligned bearings 22 are pairs of aligned bearings 26 in each of which is journaled a shaft 27. Fixed to each shaft 27 is a gear 28, the gears 28 being of equal size. Fixed to the shaft 23 is a gear 29 which meshes with both gears 28 as shown in Figures 5 and 8. Thus as the shaft 23 is driven at variable speed it in turn drives the shafts 27 at variable speed.

Fixed to the outer ends of the shafts 27 are arms 30, each arm being shorter than the distance between the shafts as shown in Figure 5 so that the arms can rotate through 360°. Carried by the arms 30 at their outer ends are spindles 31 upon which through suitable bearings 32 the tool carrier 2 is mounted. Connected to the tool carrier 2 by bolts 33 is a motor 34 having a shaft 35 carrying the rotary cutoff saw 36. The motor 34 and saw 36 are adjustable as to elevation through the use of shims 37.

Figure 3:
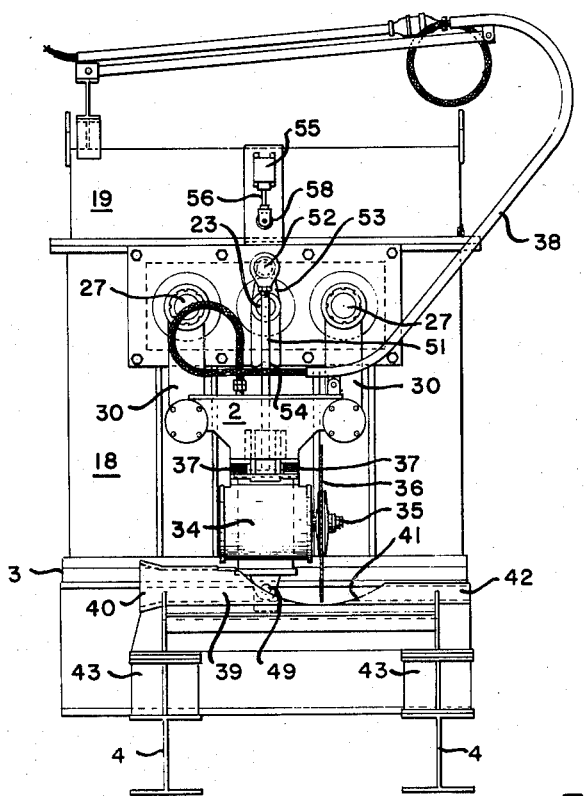
Figure 3 is a front elevational view of the mechanism shown in Figures 1 and 2.

The saw 36 is moved through a circular path counterclockwise in the plane of the paper viewing Figure 3 by rotation of the shafts 27. Current is supplied to the motor 34 through an electrc conduit 38. When the mechanism is in use the saw is driven continuously.

Mounted generally below the motor 34 and preferably having its axis in the same vertical plane as the axis of the motor and saw is a pipe guide 39. The pipe guide 39 is circumferentially closed at its entrance end which is shown at the left viewing Figure 3 at 40 and also is somewhat flared or bell-shaped as shown to facilitate entrance thereto of pipes to be sawed. In the path of the saw 36 as the saw and the tool carrier carrying it partake of motion in a circular path through rotation of the shafts 27 as above described the guide 39 is cut away as shown at 41, and at its right-hand end viewing Figure 3 the guide is of trough shape as shown at 42. The two ends of the guide 39 are completely separated from each other where the guide is cut away at 41 and are mounted upon a supporting structure 43. Thus the pipes to be sawed are guided as they advance in the path of the saw but are free to be sawed by the saw.

The pipes may be advanced to the guide 39 by any suitable means, a generally V-shaped trough 44 being shown in Figures 1 and 2 to aid in guiding the pipes. A pipe is indicated by reference numeral 45. To compensate for differences in pipe diameter the elevation of the motor 34 and saw 36 may be adjusted by changing the number of shims 37 used and/or the pipe guiding means may be altered in size and/or elevation. The lengths of pipe sawed from the pipe 45 are delivered away toward the right viewing Figure 1 through suitable guides 46 and a driven roll 47. The roll 47 is preferably driven at a speed faster than the speed at which the pipes are fed to the guide 39 so that each severed length will move away from the saw and the following portion of the pipe as soon as the severing or sawing operation has been completed.

The characteristics of the mechanism are shown in the diagram Figure 9. The elevations of pipes of different diameters being sawed are indicated at 48. The shafts 15 and 23 are shown. The lines L radiating from the axis of the shafts 15 indicate where they intersect the circle O the positions of the saw at equal time intervals determined by movement of the constant speed driving shaft 15 through equal angles of 10°. As the pipe to be sawed moves toward the left viewing the diagram Figure 9 the saw begins to enter the pipe somewhat to the left of the point A and the cut is completed somewhat to the right of the point B. But, as the diagram shows, the saw is moving in the direction of advance of the pipe at constant speed during the entire cut. The equal linear increments of advance of the saw per unit of time are designated $a$ in Figure 9. The same condition continues to about the point C whereafter the movement of the saw in the direction of advance of the pipe speeds up as indicated at $b$, $c$, $d$ and $e$. The saw passes out of the path of the pipe somewhat to the right of the point D, and thereafter the movement of the saw in the direction of advance of the pipe slows down rapidly. Such characteristics of the saw enable it to move out ahead of the oncoming pipe at the conclusion of the sawing operation so as not to interfere with the oncoming pipe. The sawed-off length of the pipe will be propelled ahead of the saw at even greater speed than the speed of the saw in its movement in the direction of advance of the pipe by the roll 47.

The saw enters the pipe being sawed at comparatively high speed as indicated at $f$ and $g$ in the diagram. Toward the end of the sawing operation the speed of movement of the saw transversely of the pipe decreases rapidly as shown at $h$, $i$, $j$ and $k$. This insures an efficient cut with minimization of any burr formed at the portion of the pipe through which the saw passes last in severing the pipe.

Pivotally mounted in the supporting structure at 49 is a cylinder 50 in which operates a piston with which is connected a piston rod 51. The piston rod 51 is pivoted at 52 to an arm 53 carried by the shaft 23 in between the shafts 27 as shown in Figure 5. The arm 53 extends beyond the shaft and has in its opposite end a recess 54. A cylinder 55 is mounted generally above the arm 53 and contains a piston with which is connected a piston rod 56 extending downwardly and carrying a yoke 57 in which is journaled a roller 58. The roller 58 is disposed directly above the arm 53. Fluid under pressure is maintained above the piston in the cylinder 55 at all times. When the tool carrier 2 is in its uppermost or inoperative position it is held in that position by the admission of fluid under pressure above the piston in the cylinder 50 and by the roller 58 being disposed in the recess 54 of the arm 53, being pressed downwardly into operative position by the fluid above the piston in the cylinder 55.

When a pipe 45 to be sawed into predetermined lengths approaches the saw 36 it trips a flag switch which closes a circuit to a solenoid which operates a four-way valve to relieve the fluid under pressure above the piston in the cylinder 50 and admit compressed air to the clutch 17. The driving shaft 15 is thus connected with the power shaft 11 and through the mechanism above described the tool carrier 2 initiates a cycle, moving counterclockwise about the axes of the shafts 27 viewing Figure 3. As above explained, and as demonstrated by Figure 9, the saw 36 saws through the pipe, advancing at constant speed equal to the speed of advance of the pipe throughout the entire period during which the pipe is being sawed. During the sawing of the pipe the saw enters the pipe in the direction transversely of the pipe at relatively high speed and toward the end of the sawing operation slows down so that it passes relatively slowly through the last part of the pipe being sawed with the advantages above pointed out. After the saw has passed through the pipe it moves ahead of the oncoming portion of the pipe until it is out of the path of the pipe as explained above. After completion of the sawing operation a cam operated switch opens the circuit to the solenoid, the flow of compressed air to the clutch 17 is cutoff and fluid under pressure is admitted to the cylinder 50 above the piston therein. Thus the tool carrier 2 is brought to rest in its uppermost position and maintained in that position by engagement of the roller 58 in the recess 54 of the arm 53. This completes the cycle.

While I have shown and described a present preferred embodiment of the invention it is to be distinctly understood that the invention is not limited thereto but may be otherwise variously embodied within the scope of the following claim.

I claim:

A variable speed transmission comprising two parallel shafts, a third shaft geared to said two parallel shafts for driving the same, an operating arm carried by the third shaft, a driving shaft parallel to the third shaft but having its axis offset from the axis of the third shaft, a driving arm carried by the driving shaft, a driving connection between the operating arm carried by the third shaft and the driving arm carried by the driving shaft, said connection having means on one of said arms engaging the other arm and moving in and out radially therealong during rotation of the shafts whereby the driving shaft drives the third shaft and hence said two parallel shafts at variable speed, arms fixed to said two parallel shafts and a head pivotally carried by the arms so that the head while maintaining constant orientation moves in a circular path at variable speed.

References Cited in the file of this patent

UNITED STATES PATENTS

| | | |
|---|---|---|
| 287,195 | Tobey et al. | Oct. 23, 1883 |
| 859,581 | Richards | July 9, 1907 |
| 986,347 | Beese | Mar. 7, 1911 |
| 1,115,000 | Martin | Oct. 27, 1914 |
| 2,119,024 | Pierce | May 31, 1938 |
| 2,163,967 | Strawn et al. | June 27, 1939 |
| 2,332,013 | Rudert et al. | Oct. 19, 1943 |
| 2,618,047 | Mansell | Nov. 18, 1952 |
| 2,709,846 | Severin | June 7, 1955 |
| 2,775,808 | Rodder | Jan. 1, 1957 |

UNITED STATES PATENT OFFICE
CERTIFICATION OF CORRECTION

Patent No. 2,947,184

August 2, 1960

Merton E. Olson

It is hereby certified that error appears in the above numbered patent requiring correction and that the said Letters Patent should read as corrected below.

In the grant, lines 1, 2, and 3, for "Merton E. Olson, of Dyer, Indiana, assignor to The Youngstown Sheet and Tube Company of Youngstown, Ohio, a corporation of Ohio," read -- Merton E. Olson, of Dyer, Indiana, --; line 12, for "The Youngstown Sheet and Tube Company, its successors" read -- Merton E. Olson, his heirs --; in the heading to the printed specification, lines 3 to 5, for "Merton E. Olson, Dyer, Ind., assignor to The Youngstown Sheet and Tube Company, Youngstown, Ohio, a corporation of Ohio" read -- Merton E. Olson, Dyer, Ind. --.

Signed and sealed this 25th day of April 1961.

(SEAL)
Attest:

ERNEST W. SWIDER
Attesting Officer

DAVID L. LADD
Commissioner of Patents